2 Sheets—Sheet 1.
R. H. COLE.
MACHINE FOR MAKING METALLIC NUTS.
No. 15,003. Patented June 3, 1856.
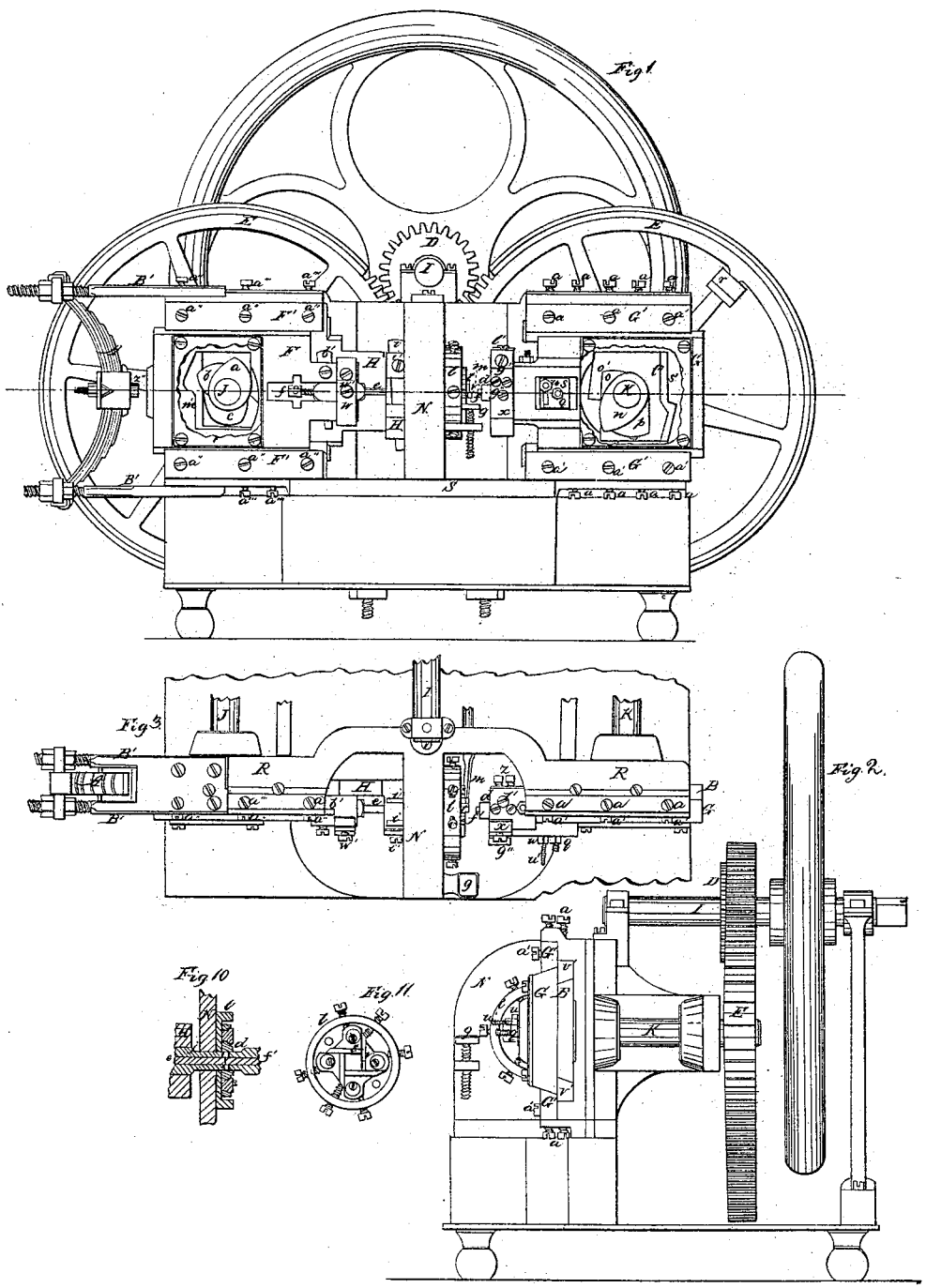

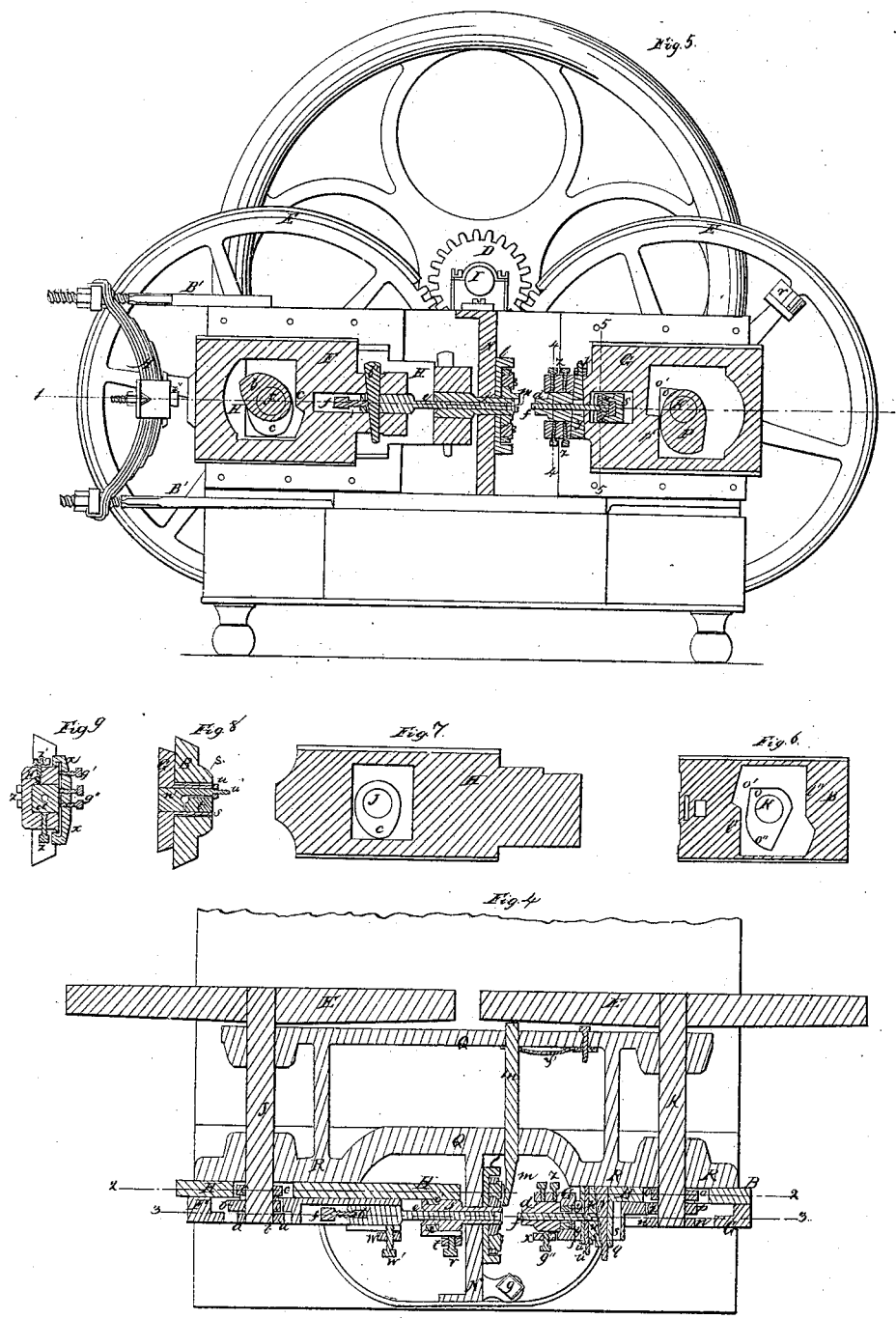

UNITED STATES PATENT OFFICE.

RICHD. H. COLE, OF ST. LOUIS, MISSOURI.

MAKING NUTS.

Specification forming part of Letters Patent No. 15,003, dated June 3, 1856; Reissued February 21, 1860, No. 901.

*To all whom it may concern:*

Be it known that I, RICHARD H. COLE, of the city of St. Louis, in the State of Missouri, have invented a new and Improved Machine for Making Metallic Nuts; and I do hereby declare that the following is a full and exact description thereof, reference being had to the accompanying drawings, making a part of this specification.

Figure 1, is a side elevation of the aforesaid machine; Fig. 2, an end view of the same; Fig. 3, a top view; Fig. 4, a horizontal section, in the line 1, 1, of Fig. 1; Fig. 5, a vertical longitudinal section in the line 3, 3, of Fig. 4; Figs. 6 and 7, vertical sections of detached portions of the machine, in the line 2, 2, of Fig. 4; Fig. 8, a transverse section of a detached portion of the machine in the line 5, 5, of Fig. 5; Fig. 9, a transverse section of a detached portion of the machine in the line 4, 4, of Fig. 5; Fig. 10, a vertical longitudinal section of a portion of the machine in the line 1, 1, of Fig. 1, showing the parts represented as having just formed a nut in the nut box; and Fig. 11, is a front view of the nut box detached from the machine.

The feature of novelty in my improved machine for making metallic nuts, is the peculiar arrangement and operation of its parts by which the nuts formed in said machine, are thicker than the bar from which they are cut; this being accomplished by forcing all, or nearly all, the metal displaced in forming the holes in the nuts, into the bodies of said nuts.

The advantages that follow from this improvement, are self-evident. The nuts made in my machine, will be more perfect in form, and the wads which are removed by other machines in forming the holes in the nuts, and which have to be sold at a very low price as scrap iron, being by my process put into the manufactured article, causes the improved nuts made by my machine to cost considerably less than the less perfect nuts made by any other known machine.

The box in which the nuts are formed in my said machine, may be constructed in any manner that may be deemed expedient. It should be so constructed as to have a cutting angle on the front side of its mouth, for the purpose of enabling a blank for a nut to be cut from a bar by the joint action of the said cutting angle and the front angle of the angular punch $d$, as it is carried forward toward the nut box and is brought in contact with the bar fed into the machine immediately in front of said box. The projections $t$, $v$, from the top and farther side of the mouth of the nut-box, in connection with the adjustable rest $g$, enables the operator to accurately guide the end of the bar to the proper position in front of the nut box as it is fed into the machine.

The angular punch $d$, is received into a mouth in the head of the sliding plate G, where it is held in front by the clamp $x$, and the set screws $g''$, $g''$, and at its top, bottom, and rear sides, by set screws which pass through the top, bottom, and rear side of the said mouth—as shown in Fig. 9. The inner end of the body of the angular punch $d$, bears against the wedge $y$, which works in a vertical opening in the head of G, and has a screw shank at its upper extremity, on which works the regulating nut $k$. By means of the lateral and vertical set screws $z$, $z'$, $g'$, $g''$ and the adjustable wedge $y$, the angular punch $d$, can be moved out or in, and may be adjusted in any desired position. The requisite movements are imparted to the angular punch $d$, by means of two differently shaped cams $n$, and $p$, on the shaft K, which work within a doubly recessed opening in the plate G, whose working faces are of such a shape that the former cam serves to move said plate rearward, and the latter, to move the plate forward and to retain it in its extreme forward position for a few seconds. A round punch $f'$, works in a correspondingly shaped aperture in the center of the angular punch $d$, and is connected to a projection $s$, from the rear sliding plate B, which passes through a slot in the front sliding plate G, as represented in Figs. 4 and 5. The rear end of the round punch $f'$, bears against the horizontal wedge $r$, which is adjusted in its position by means of the screw nut $g$, working on a screw shank projecting from the smaller end of said wedge, as shown in Fig. 4. The head of the said round punch $f'$, is secured within the projection $s$, by means of the thin plates $t$, and $n'$,—working in a transverse slot in $s$—the screw shank $u'$—projecting from $n'$—and the nut $u$, as represented in Fig. 8. The proper reciprocating movements are imparted to the round punch $f'$, by means of the cam $o$, placed on the shaft K, immediately within the cam $p$, and working in an aperture in the plate B,—the shape of which aperture and also of the cam $o$, being shown in Fig. 6.

The punch $d$, is of such a size, and is so arranged that, after the cutting off a blank for a nut, in front of the nut box, it enters the nut box, carrying the said blank before it, and compresses it with such force against the bottom $j$, of the nut box, as to give it the exact shape that may be desired. To insure perfectly formed nuts in all cases, when the bars from which they may be cut, may be thinner than usual, and also to prevent injury to the machine when a thicker bar than usual is fed into the machine, or when two nuts chance to get into the nut box at the same time, I give an elastic bearing to the bottom $j$, of the nut box by causing the outer end of the sliding plate F, to bear against the spring A, at the time that a nut is being formed.

The projecting portion of the bottom $j$, of the nut-box, is secured between outwardly projecting jaws from the inner end of the sliding plate H, by means of the keys $i$, $i$, the clamp $t'$, (Fig. 4,) and the set screws $i'$ and $v$—or in any other suitable manner. The bottom $j$, of the nut box, is thrown forward to discharge a finished nut, and then drawn back again, preparatory to forming another nut, by means of the cam $c$, on the shaft J, which works in an oblong rectangular opening in the sliding plate H, as represented in Fig. 7.

A round punch $e$, works in a correspondingly shaped aperture in the center of the bottom $j$, of the nut box; the head of the said round punch $e$, is secured between projections from the front side of the inner end of the sliding plate F, by means of the clamp $w$, the tapering key $b'$, and the set screws $w'$ as represented in Figs. 1 and 5, or in any other suitable manner. The tapering key $b'$, passes through an oblong mortise in the head of the round punch $e$, and a set screw $f$, is inserted into a screw aperture in the end of the said head and bears against the outer edge of the said key $b'$, by means of which arrangement the round punch $e$, can be thrown in or out and secured in any desired position.

The necessary reciprocating movements are imparted to the round punch $e$, during the performance of the machine, by means of the two cams $a$, and $b$, on the shaft J, working in a recessed opening in the sliding plate F, in the manner hereinafter set forth.

A suitable form for the metallic frame of my improved nut making machine, is represented in the accompanying drawings and designated by the letters N, R, R, Q, Q. The respective pairs of sliding plates G, B, and F, H, are secured within shouldered recesses in the vertical portions R, R, of the frame of the machine, by means of the series of inner bevel-edged bearers $v'$, $v'$, (Fig. 4,) and the series of outer bevel-edged bearers F', F', and G', G', and a suitable number of set-screws $a$, $a'$, $a''$, $a'''$; a portion of which set-screws pass through the said bearers and are tapped into the said portions R, R, of the frame of the machine; and the remainder pass through the projections from the said portions of the frame, above and below the sliding plates B, G, and F, H, and act against the outer edges of the bearers F', F', G', G', $v'$, $v'$. Or the said sliding plates may be supported in proper positions in any other suitable manner. The shafts J, K, work in suitable bearings and are rotated by means of cog-wheels E, E, on their inner ends which gear into a pinion D, on the driving shaft I.

The accompanying drawings represent the respective parts of my improved nut making machine in the position they are thrown into immediately after the last movement in forming a nut and discharging it from the machine. From this position, the said parts move as follows when the machine is put in motion. The cam $p$ strikes against the surface $p'$ at the inner side of the aperture in the sliding plate G, and carries forward the punch $d$, toward the mouth of the nut-box; and at the same moment, the cam $c$, strikes against the rear edge of the aperture in the sliding plate H, and produces a rearward movement of the bottom $j$, of the nut box, preparatory to the reception within said box, of the red hot blank cut off by the punch $d$, in its forward movement. The said sliding plate H, is thrown outward until its outer end is brought in contact with the adjustable projection $z''$, from the spring A; and at the same time that this takes place, the advancing punch $d$, brings the blank nut in contact with the bottom of the nut box and continues to advance until the requisite shape has been imparted to said nut. While the segment-shaped portion of the face of the cam $p$, is acting upon the punch $d$, through the sliding plate G, the cam $b$, strikes against the surface $c'$ at the inner side of the aperture in the plate F, and carries forward the round punch $e$; and at the same moment, the projection $o''$ of the cam $o$, strikes against the surface $l'$ (Fig. 6,) at the inner side of the aperture in the plate B, and carries forward the round punch $f'$. The said cams $b$, and $o$, are so proportioned that they carry forward the round punches $e$, and $f'$, into the hot yielding nut blank until they nearly meet in the center of the same; which movement of the said punches forms the hole in the nut-blank, by forcing the metal from the center thereof into the body of the same, thereby causing the nut formed to be thicker than the bar from which it was cut—the bottom of the nut box giving back to allow the nut to increase in thickness—and the increased pressure, from the center outward, thus exerted upon the nut, insures absolute perfection of form at every side and angle. The projection $o''$, of the cam $o$, passes above the surface $l'$, of the plate B, and ceases to operate upon the round punch $f'$, while the round punch $e$, is still advancing, and while the segment-shaped portion of the cam $p$, is acting on the angular punch $d$, through the medium of the sliding plate G. The round punch $f'$, is carried outward by the action of the angle $o'$ of the cam $o$, against the surface $l''$ of the plate B, while the round punch $e$, is carried forward by the cam $b$, until it passes through the nut and enters a short distance into the aperture in the end of the angular punch $d$, left by the receding round punch $f'$—where it deposits the wad which was formed in the center of the nut blank when the ends of the round punches were brought nearly in contact with each other, as before described. The moment that the cam $b$, ceases to carry forward the round punch $e$, the cam $a$, strikes the surface $m'$ at the outer side of the aperture in the plate F, and withdraws the said punch; and simultaneously with said movement, the cam $c$, strikes against the inner side of the aperture in the plate H, and carries forward the bottom of the nut-box to discharge the finished nut. The moment that the finished nut is carried out clear of the nut-box, it is separated from the bottom of the nut-box by the action of the spring bar $m$, which is forced inward against the nut by the projection $r$, on the cog-wheel E.

Immediately after a finished nut has been discharged from the machine, the angle $o'$ of the cam $o$, strikes against the surface $l'$, (Fig. 6) of the sliding plate B, and thrusts the end of the round punch $f'$, a short distance out of the end of the angular punch $d$, for the purpose of discharging therefrom the thin wad (which was deposited there in forming the previous nut) preparatory to the forward movement of the said angular punch $d$, for the purpose of forming another nut, by the aid of the movements of the other parts of the machine, in the manner substantially as herein before set forth.

What I claim as my invention and desire to secure by Letters Patent, in the manufacture of metallic nuts, is—

Forcing a portion, or the whole, of the metal displaced in forming the holes in the nuts, into the bodies of the nuts; by which I am enabled to make the nuts thicker and more compact than the bar from which they are cut, all substantially as herein set forth.

The above specification of my new and useful improvement in machines for making metallic nuts, signed and witnessed this third day of October A. D. 1855.

R. H. COLE.

Witnesses:
GEO. W. ADAMS,
ARCHIE KERR.

[FIRST PRINTED 1912.]